United States Patent [19]

Kato et al.

[11] Patent Number: 4,865,468
[45] Date of Patent: Sep. 12, 1989

[54] WHEEL BEARING ASSEMBLY FOR AUTOMOTIVE WHEEL

[75] Inventors: Masao Kato; Yoichiro Mitani; Tsuneo Yamada, all of Kuwana, Japan

[73] Assignee: NTN Toyo Bearing Co., Ltd., Osaka, Japan

[21] Appl. No.: 199,738

[22] Filed: May 27, 1988

[51] Int. Cl.$^4$ .............................................. F16C 33/30
[52] U.S. Cl. ..................................... 384/448; 384/446; 384/506
[58] Field of Search ............... 384/446, 448, 506, 512; 340/682

[56] References Cited

U.S. PATENT DOCUMENTS

| | | | |
|---|---|---|---|
| 4,069,435 | 1/1978 | Wannerskog et al. | 384/446 X |
| 4,688,951 | 8/1987 | Guers | 384/446 |
| 4,732,494 | 3/1988 | Guers et al. | 384/446 X |
| 4,778,286 | 10/1988 | Kadokawa | 384/446 |

FOREIGN PATENT DOCUMENTS 0157514  8/1985  Japan ................................ 384/448

Primary Examiner—Thomas R. Hannon
Attorney, Agent, or Firm—Armstrong, Nikaido Marmelstein Kubovcik & Murray

[57] ABSTRACT

A wheel bearing assembly for an automotive wheel equipped with a detector for the number of revolutions of a wheel hub. It has an outer member and two inner members mounted in the outer member through rolling elements. A pulse ring in the form of a multipolar magnet is mounted in the bearing assembly so as to be fixedly held in annular grooves formed in the outer periphery of the inner members at their abutting ends or to be supported on one of the inner members. A sensor including a Hall IC is mounted in the outer member at such a position as to face the pulse ring. The pulse ring rotates with the inner members to allow the sensor to detect the rotational speed of the wheel.

7 Claims, 2 Drawing Sheets

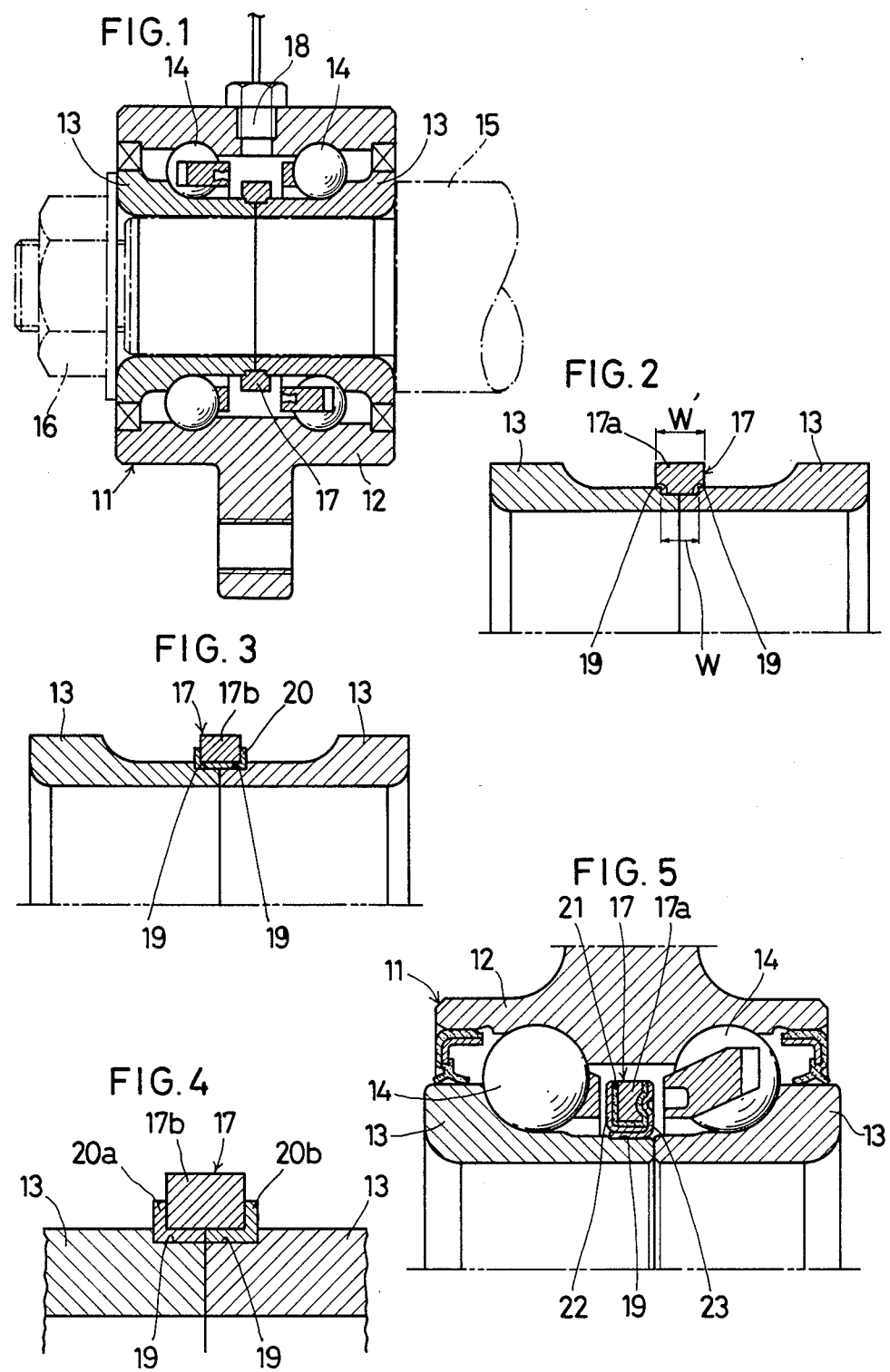

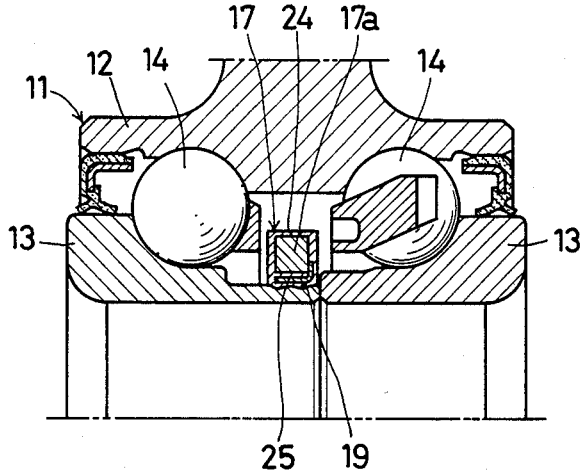
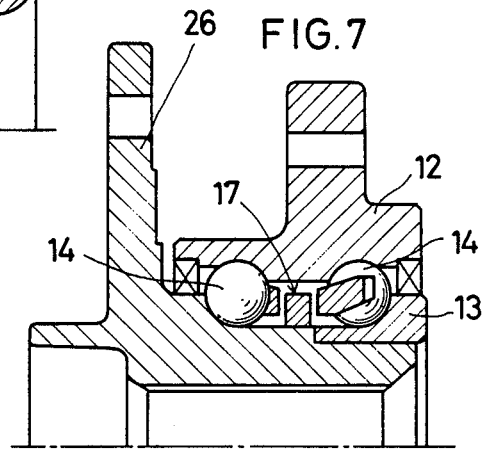
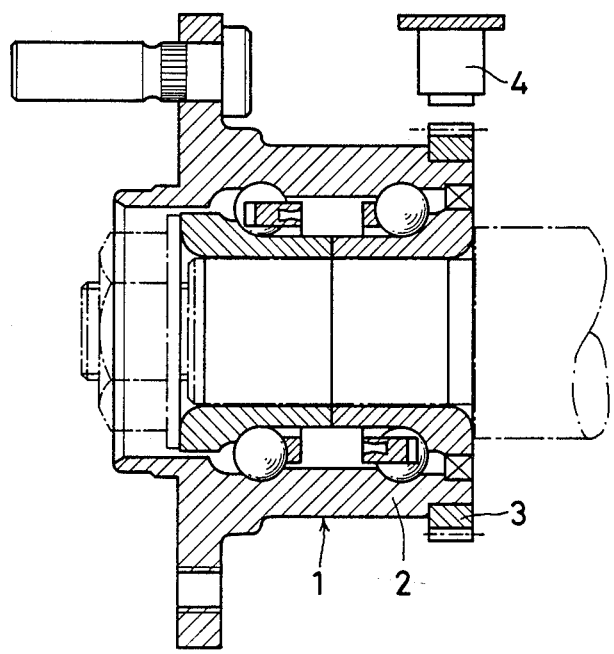
FIG. 8 PRIOR ART

WHEEL BEARING ASSEMBLY FOR AUTOMOTIVE WHEEL

BACKGROUND OF THE INVENTION

The present invention relates to a wheel bearing assembly for an automotive wheel, and more particularly to a bearing assembly equipped with means for detecting the number of revolutions of a wheel hub to control an automobile by means of an anti-skid braking system (hereinafter abbreviated to ABS).

The ABS is provided to control the braking force according to the number of revolutions of wheel hubs so that the wheels will not lock and thus the automobile will not skid. For this control, an ABS-equipped automobile requires bearing assemblies capable of detecting the number of revolutions of the wheel hubs.

FIG. 8 shows a prior art bearing assembly of this type. A wheel bearing 1 for a wheel has a pulse ring 3 in the form of a gear press-fitted on the outer periphery of an outer member 2 at one end thereof and a solenoid sensor 4 disposed so as to face the outer periphery of the pulse ring 3. Since the pulse ring 3 is made of stainless steel to protect it from rust, it is not only heavy but also its material and manufacturing costs are rather high.

SUMMARY OF THE INVENTION

An object of the present invention is to provide a wheel bearing assembly for an automotive wheel which obviates the abovesaid shortcomings and which is inexpensive, small in size, and light in weight.

In accordance with the present invention, there is provided a wheel bearing assembly for an automotive wheel comprising an outer member, two inner members mounted in the outer member through rolling elements mounted therebetween, a pulse ring in the form of a multipolar magnet mounted on the outer periphery of at least one of the inner members, and sensor mounted in the outer member at such a position as to face the pulse ring.

The pulse ring is fixedly mounted on the outer periphery of the inner members of the wheel bearing assembly so as to be rotatable with the inner members. The sensor mounted in the outer member cooperate with the pulse ring to detect the rotation speed of the wheel hub. One of the input members may be a wheel hub.

The present invention will provide the following effects and advantages:

(I) The pulse ring in the form of a multipolar ferrite magnet fixedly mounted on the outer periphery of the inner members contributes to the reduction of the weight, size and cost of the wheel bearing assembly.

(II) By mounting the pulse ring on the outer periphery of the inner member, in other words, by housing it in the wheel bearing, the pulse ring is kept from being soiled with dust, thus improving the detecting accuracy.

(III) The Hall IC used as the sensor permits an accurate detection of even a low rotation speed.

Other features and objects of the present invention will become apparent from the following description taken with reference to the accompanying drawings, in which:

BRIEF DESCRIPTION OF THE DRAWINGS

FIG. 1 is a vertical sectional view of the first embodiment of the wheel bearing assembly in accordance with the present invention;

FIG. 2 is an enlarged vertical sectional view of a portion of the same;

FIG. 3 is a similar view of the second embodiment;

FIG. 4 is a similar view of the third embodiment;

FIG. 5 is a similar view of the fourth embodiment;

FIG. 6 is a similar view of the fifth embodiment;

FIG. 7 is a similar view of the sixth embodiment; and

FIG. 8 is a similar view of a prior art wheel bearing assembly.

DETAILED DESCRIPTION OF THE PREFERRED EMBODIMENT

Now referring to FIG. 1, a wheel bearing assembly 11 for an automotive wheel comprises an outer member 12 and a pair of inner members 13 supporting a wheel shaft 15 and rotatably mounted in the outer member 12 through rolling elements 14 interposed therebetween. A nut 16 threadedly engaging the wheel shaft 15 axially tightens the inner members 13.

A pulse ring 17 in the form of a multipolar ferrite magnet is mounted in the bearing 11 on the outer periphery of the inner members 13 at their abutting ends. A sensor 18 comprising a Hall IC is mounted in the outer member 12 so as to face and cooperate with the pulse ring 17.

The pulse ring 17 bridging the inner members 13 is elastically pressed between the inner members by tightening the nut 16 so as to be rotatable with the inner members.

The pulse ring 17 has a plurality of N and S poles circumferentially arranged alternately at equal intervals. The alternating magnetic field appearing when the pulse ring 17 is rotated actuates the Hall IC sensor 18, allowing it to measure the number of revolutions.

As a multipolar ferrite magnet for the pulse ring 17, either a resilient magnet 17a made of rubber or synthetic resin or a hard magnet 17b may be used. The pulse ring 17 is fixedly mounted on the inner members 13 by a suitable means which is selected according to the material of the magnet.

A resin magnet may be used which is made by mixing a synthetic resin such as polyamide, polyolefin or an ethylenically copolymer, a magnetic powder such as barium ferrite, strontium ferrite or a rare earth powder, and a small amount of additives as necessary, uniformly kneading the mixture and molding it into a ring. The magnet is alternately magnetized so that a total of N and S poles will be 50 to 200.

FIGS. 1 and 2 show the first embodiment of the present invention in which the resilient magnet 17a is used as the pulse ring 17. The inner members 13 are formed with annular grooves 19 in their outer peripheries at their abutting ends. The resilient magnet 17a is mounted in the grooves 19 and the inner members 13 are tightened against each other by the nut 16 to resiliently hold the magnet 17a therebetween.

The grooves 19 are formed so that their total width W will be smaller than the width W' of the pulse ring 17. The difference between W and W' acts as an interference which allows the pulse ring 17 to be pressed hard and fixed in position between the grooves 19.

FIG. 3 shows the second embodiment in which the hard magnet 17b is used as the pulse ring 17. The inner members 13 are formed with annular grooves 19 in their outer peripheries at their abutting ends. The hard magnet 17b has its inner periphery and lower side surfaces covered with an elastic body 20 of rubber or synthetic resin and is mounted in the grooves 19 to be tightened in position by the inner members 13 through the elastic body 20. The latter will protect the hard magnet 17b against breakage when it is tightened by the nut 16.

In the third embodiment shown in FIG. 4, the hard magnet 17b is fixed in position in a different manner. The hard magnet 17b has its inner periphery and lower sides covered with two elastic bodies 20a and 20b having an L-shaped section and set in the annular grooves 19. By providing two separate elastic bodies 20a and 20b at both sides of the magnet 17b, the latter can be more rigidly and stably mounted.

FIG. 5 shows the fourth embodiment in which the resilient magnet 17a is used. It is covered with steel cases 22 and 23 of an L-shaped section through a silicone rubber 21 of a U-shaped section over its inner periphery and both sides, while having its outer periphery exposed, and fixedly mounted on one of the inner members 13 in the annular groove 19.

In the fifth embodiment shown in FIG. 6, the resilient magnet 17a is used, too. It is enclosed over its entire periphery with a rubber layer 24 having a reinforcing steel plate 25 of an L-shaped section embedded therein and is fixedly mounted on one of the inner members 13 in the annular groove 19.

In the sixth embodiment of FIG. 7, one of the inner members 13 is replaced with a wheel hub 26 which serves as an inner member. The pulse ring 17 is mounted on the outer periphery of the wheel hub 26.

In the embodiments shown in FIGS. 1 to 4, the pulse ring 17 is mounted so as to cover the annular grooves 19 formed in both of the inner members 13 at their abutting ends. The nut 16 is then tightened to butt the inner members 13 together at their end faces. The pulse ring will thus be elastically held in position owing to the difference of width between the pulse ring 17 and the grooves 19. In the embodiments shown in FIGS. 5 and 6, the pulse ring 17 is fixedly mounted on one of the inner members 13. In either case, the inner members 13 are rotated in unison, allowing the sensor 18 to detect the number of revolutions of the wheel.

What is claimed is:

1. A wheel bearing assembly for an automotive wheel comprising:
    a pair of coaxial inner rings each having a cross-sectional end directly abutting each other, each of said inner rings being provided with an annular step portion around an outer peripheral surface of said end such that said annular step portions form an annular groove when both ends of said pair of inner rings are directly coaxially abutted;
    a pulse ring provided within said annular groove, said pulse ring being a multipolar magnet; and
    an outer ring coaxially arranged over said pair of inner rings and having a sensor positioned directly above said annular pulse ring.

2. The wheel bearing wheel bearing assembly of claim 1 further comprising an annular elastic body provided between said annular groove and said annular pulse ring.

3. The wheel bearing assembly of claim 2, wherein said elastic body is formed of two portions each having a cross-section of a substantially L shape.

4. The wheel bearing assembly of claim 1, wherein said pulse ring has an inner peripheral surface provided with a projection which abuts within said annular groove.

5. The wheel bearing assembly of claim 1, wherein said pulse ring is covered by a steel case and a resilient member.

6. The wheel bearing assembly of claim 1, wherein said pulse ring has a resilient and a reinforcing steel plate therein.

7. The wheel bearing assembly of claim 1, wherein said pulse ring is held by both inner rings.

* * * * *